C. C. EGERTON.
VEHICLE HUB-ATTACHING DEVICES.
No. 194,342.  Patented Aug. 21, 1877.
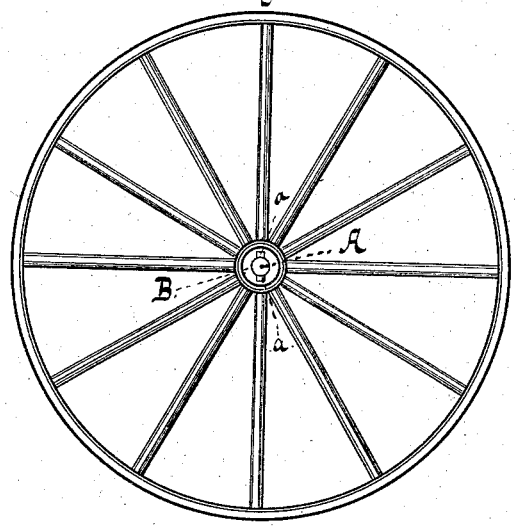
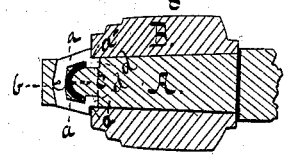
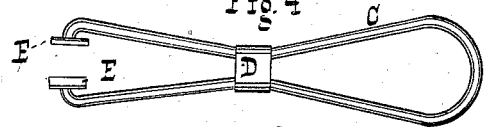

UNITED STATES PATENT OFFICE.

C. CALVERT EGERTON, OF BALTIMORE, MD., ASSIGNOR OF TWO-THIRDS OF HIS RIGHT TO WALTER S. RICHMOND AND HERBERT RICHMOND, OF NEW YORK CITY.

IMPROVEMENT IN VEHICLE-HUB-ATTACHING DEVICES.

Specification forming part of Letters Patent No. 194,342, dated August 21, 1877; application filed July 10, 1877.

*To all whom it may concern:*

Be it known that I, C. CALVERT EGERTON, of the city of Baltimore, State of Maryland, have invented certain new and useful Improvements in Wagon-Axles; and I hereby declare the same to be fully, clearly, and exactly described as follows, reference being had to the accompanying drawings, in which—

Figure 1 represents a wheel and axle embodying my improvements; Fig. 2, a plan view of that part of my axle which enters the hub of the wheel; Fig. 3, a longitudinal sectional view of the hub and axle; Figs. 4 and 5, side and front views of my device for releasing the wheel from the axle.

The means most commonly in use for retaining the wheels of vehicles upon their axles consists of right and left handed nuts upon, respectively, the right and left ends of the axles, the latter being threaded to receive the nuts.

It is obvious that forward motion of the vehicle tends constantly to tighten the nuts; but in backing the reverse is the case, and thence arises the danger of the wheels coming off from the accidental unscrewing of the nuts.

The ordinary pin, used as a substitute for the nut, is not open to the above objections; but others exist which have almost driven it out of use. The pin, if straight, is liable to jolt out, and if bent to obviate this tendency, its removal, when it is desired to grease the axle, is rendered somewhat difficult.

The subject of the present invention is open to none of these objections. The wheel cannot possibly become accidentally displaced, and its removal, when desired, is greatly facilitated.

In the accompanying drawings, A represents the axle, which is slotted near its extremity for the insertion of the ears $a$ $a$, and is perforated at right angles to the slot for the insertion of the bolt $b$, upon which the ears $a$ $a$ are pivoted. Between the ears is inserted a spring, $c$, whose function will be presently described. The shoulders $a'$ upon the pieces $a$ $a$ are at a distance from that upon the axle exactly equal to the length of the hub, so that lateral movement in the latter is impossible.

In order to place the wheel upon the axle, the latter is raised by means of a suitable jack, and the hub forced into its seat. The spring-ears $a$ $a$ readily yield to the pressure until the hub is forced home, when the spring $c$ causes them to fly apart until the projections $d$ bring up against the lining of the hub.

It is obvious that by this means the wheel is securely retained upon the axle, the simultaneous depression of both ears $a$ $a$ being necessary to effect its release.

In order to accomplish this when desired, I make use of the device illustrated in Figs. 4 and 5, wherein C represents a bar of metal, bent as shown, and having sufficient rigidity to overcome the tension of the spring $c$. A suitable strap, D, serves to hold the arms of the clamp C in place. At the extremities of these arms are attached the curved pieces E E.

In order to remove the wheel from the axle, the clamp C is pressed upon the end of the latter, the pieces E E bearing upon the ears $a$ $a$, causing them to close within the axle, and enabling the hub to be readily slid over them.

My invention is especially applicable to ambulances, gun-carriages, and vehicles intended for carrying heavy loads, in which cases absolute immunity from all danger of accidental displacement of the wheels is a necessity.

A suitable cap should, of course, be screwed upon the hub, in order to cover the end of the axle and prevent the entrance of dust.

I am aware that a form of apparatus resembling mine, except in certain features pointed out in my claim—the said device being used for attaching the fish-plates to railroad-rails—is in use. Such form of device and such use I therefore do not claim.

Having thus described my invention, what I claim as new, and desire to secure by Letters Patent, is—

In combination with the axle A, the ears $a$ $a$, having rectangular shoulders $a'$ $a'$ and projections $d$ $d$, and the spring $c$, substantially as described.

C. CALVERT EGERTON.

Witnesses:
R. D. WILLIAMS,
W. S. BERTRAM.